United States Patent [19]

Sikora

[11] Patent Number: 5,433,772
[45] Date of Patent: Jul. 18, 1995

[54] ELECTROSTATIC AIR FILTER FOR MOBILE EQUIPMENT

[76] Inventor: David Sikora, 15105 Meandering Pl., Dallas, Tex. 75248

[21] Appl. No.: 137,602

[22] Filed: Oct. 15, 1993

[51] Int. Cl.⁶ .............................................. B03C 3/08
[52] U.S. Cl. ......................................... 96/87; 55/357; 55/385.3; 96/88; 96/89; 96/96; 422/120
[58] Field of Search ............ 96/79, 86, 87, 96, 62-64, 96/88, 89, 92, 98; 55/385.3, 357; 422/120

[56] References Cited

U.S. PATENT DOCUMENTS

| 3,425,189 | 2/1969 | Haselmayer | 96/64 |
| 4,227,446 | 10/1980 | Sone et al. | 55/385.3 X |
| 4,231,766 | 11/1980 | Spurgin | 96/79 |
| 4,290,788 | 9/1981 | Pittman et al. | 96/86 |
| 5,120,334 | 6/1992 | Cooper | 55/385.3 |
| 5,215,558 | 6/1993 | Moon | 96/79 X |

FOREIGN PATENT DOCUMENTS

| 2405528 | 8/1974 | Germany | 96/96 |
| 566171 | 9/1975 | Switzerland | 96/87 |
| 931625 | 7/1963 | United Kingdom | 96/79 |
| 1082234 | 9/1967 | United Kingdom | 96/79 |

Primary Examiner—Richard L. Chiesa
Attorney, Agent, or Firm—Kenneth R. Glaser

[57] ABSTRACT

A high voltage electrostatic filter has alternating oppositely charged plates with an ionizing wire affixed directly to alternate plates so as to be included in a removable charged assembly unit which may also include the high voltage source and deflection of the direction of air flow by the charged plates brings airborne particulate into contact with the plates.

10 Claims, 4 Drawing Sheets

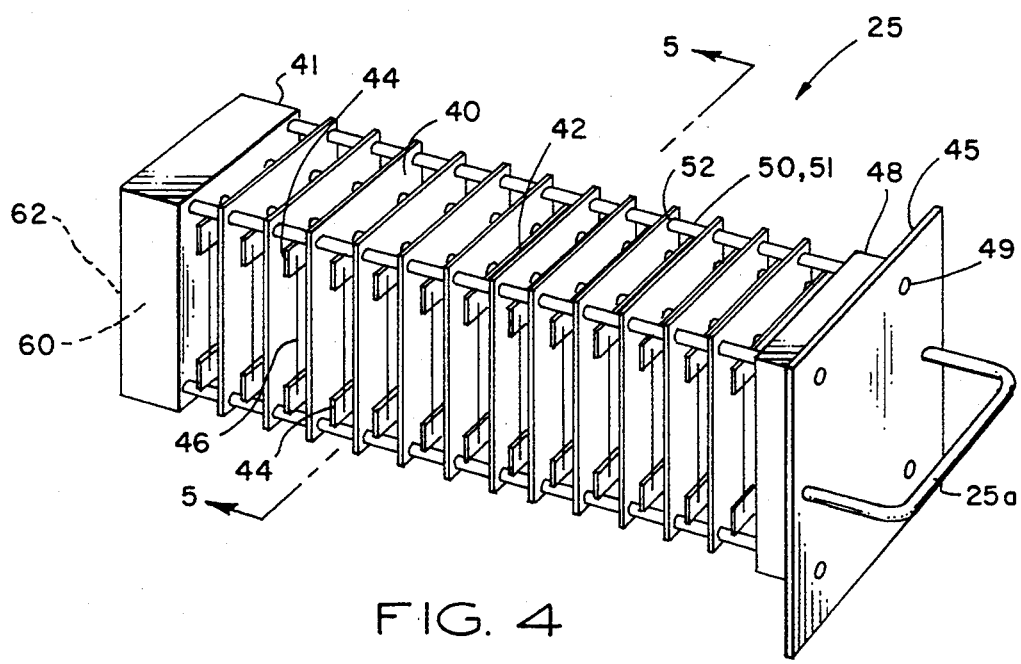
FIG. 4
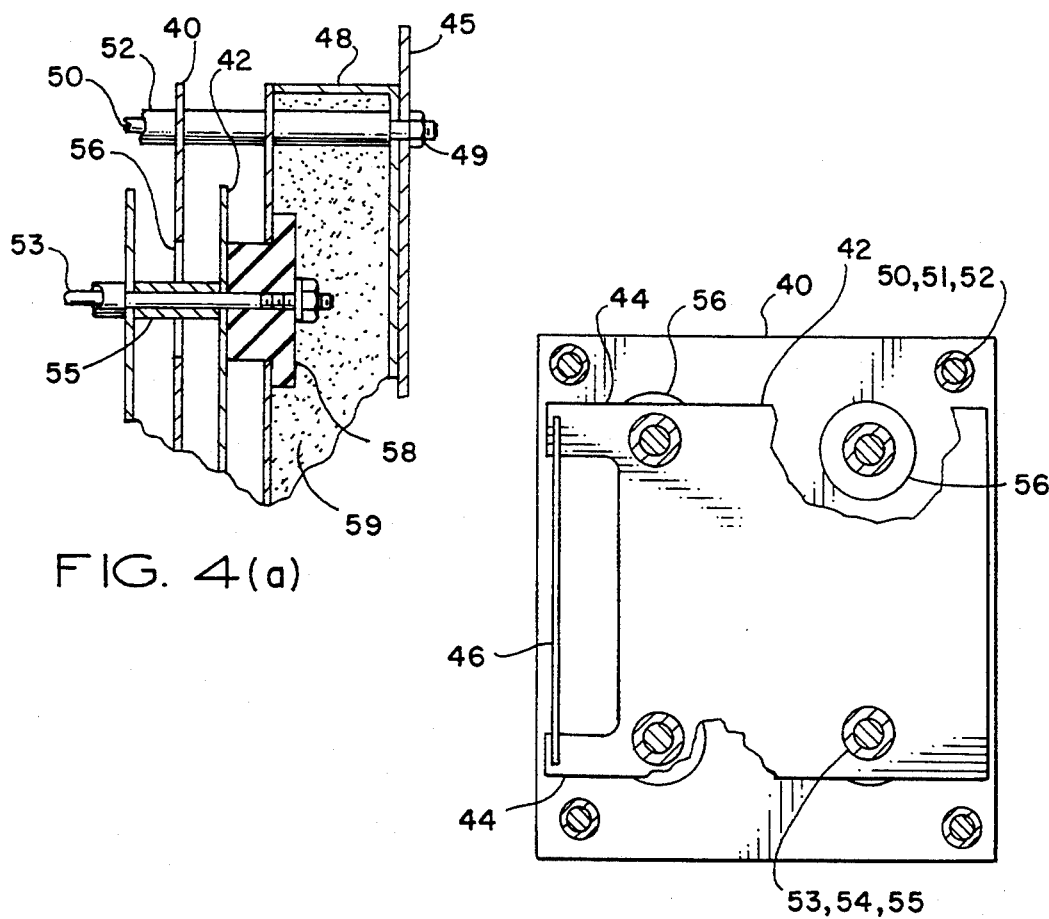
FIG. 4(a)
FIG. 5

ELECTROSTATIC AIR FILTER FOR MOBILE EQUIPMENT

FIELD OF THE INVENTION

The present invention is related to the field of electrostatically charged air purifying and deodorizing apparatus and particularly, to such equipment made for use in vehicles or aircraft.

BACKGROUND AND SUMMARY OF THE INVENTION

The desirability of purifying and deodorizing interior air for vehicles and airplanes is well known to users and people who work in such an environment. Those skilled in the art are familiar with devices which have been offered to address this need. Electrostatic filtering devices or precipitators ionize, or electrically charge, particulate in the incoming air stream to facilitate its removal. Ionization is achieved by exposure to an electrical field of as much as 6,000 volts, which is confined to a small area to produce an extremely intense field. A thin wire, stretched across the air flow path, displays this small area to best effect and a series of these wires are usually spaced to cover the entire path. The ionized air flow is then directed to pass through an alternating array of like and oppositely charged plates where the charged particulate is repelled by the like charge and attracted to the opposite charge for collection.

In a stationary system, size and weight are not critical and shock loading is not a consideration but in a mobile these factors become paramount. Ideally, such a unit should remove smoke and particulate down to submicronic matter, bacteria and viruses, but size and weight limiting considerations have caused typical current mobile electrostatic filtering devices to perform in the 5 micron range. An ionizing wire and collecting plate array form a complex structure with each plate insulated from its neighbors and moreover, a structure which must be open to permit free air flow, rigid to maintain critical spacing and shock mounted to prevent damage. As a result, filter makers will dispense with the ionizing wire while sacrificing efficiency in order to make a more rugged unit for vehicular service. Furthermore, to avoid frequent need for time consuming plate cleaning procedures and possible damage by users, manufacturers currently recommend that their automotive units be used only for limited periods. In this manner, plate cleaning can be treated as an item of scheduled vehicle maintenance and done only by trained personnel.

Thus, an object of the present invention is to provide a self-contained, light weight, compact electrostatic filtering unit which is suitable for installation in any vehicle or airplane. A second object is to provide such a unit without any compromise of its performance. A third object is to equip this unit with an ionizing wire and collecting plate array which is sufficiently simple and rugged that the user can readily remove it, wash it in a home dish washer and reinstall it.

These objects are realized in the present invention by a novel configuration of an ionizing wire/collecting plate array wherein the wires are mounted directly to extended portions of like charged plates so as to extend along the width thereof and are positioned in an alternating series between oppositely charged plates. This permits a compact assembly of the ionizing wire and collecting plates which can be easily removed and replaced as a unit. Preferred embodiments of the invention also include means for directing the air flow to contact collecting plate surfaces while passing therebetween, thereby enhancing collection efficiency and various auxiliary pre-filtering or post-filtering means.

BRIEF DESCRIPTION OF THE DRAWINGS

The aforementioned and other objects and features of the invention will be apparent from the following detailed description of specific embodiments thereof, when read in conjunction with the accompanying drawings, in which:

FIG. 4 shows a preferred embodiment of the collector assembly of the present invention;

FIG. 4(*a*) is a detail section view taken from FIG.

FIG. 5 shows a cross section taken along line 5—5 of FIG. 4;

DETAILED DESCRIPTION OF THE PREFERRED EMBODIMENTS

Figure 1:
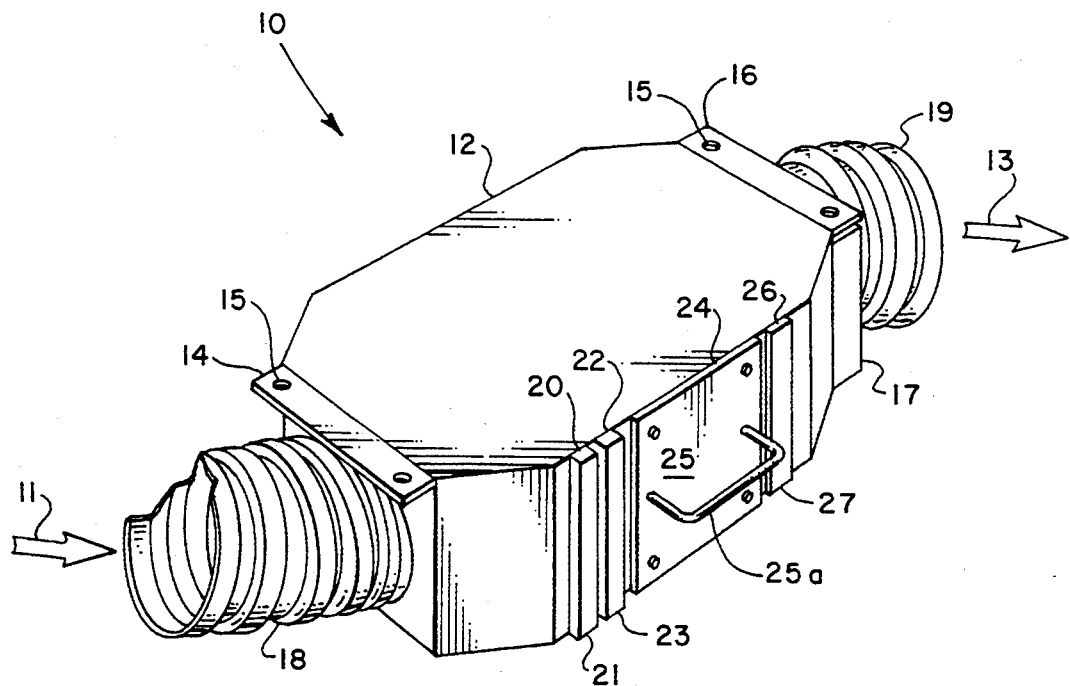
FIG. 1 shows an overall view of a preferred embodiment of the present invention.
Figure 2:
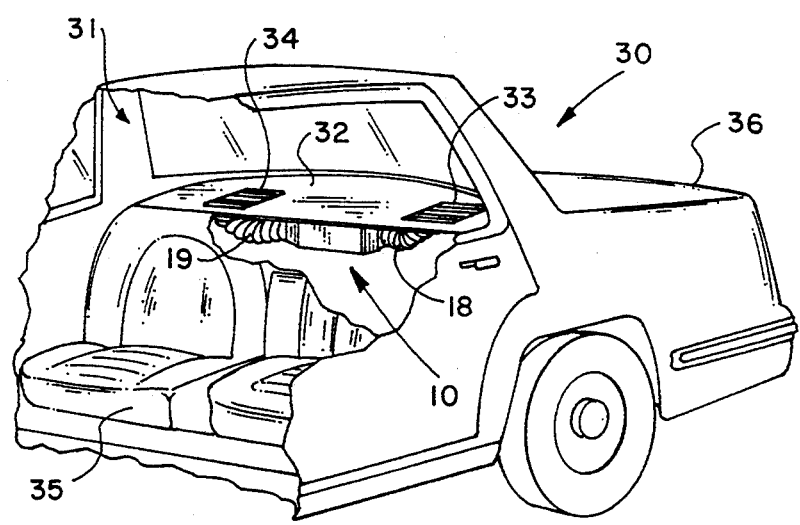
FIG. 2 shows the electrostatic filter unit of FIG. 1 in a typical installation.

A preferred embodiment 10 of the present invention, as in FIG. 1, comprises housing 12, through which a flow of air is indicated by inlet arrow 11 and outlet arrow 13. Fan 17, mounted at the outlet end of housing 12, maintains this air flow continuously when the unit is operating. Inlet duct 18 and outlet duct 19, while not required for open installation of the unit, are provided to remove and return air from a compartment in an enclosed installation, as shown below in FIG. 2. Brackets 14 and 16 provide mounting holes 15 at either end of housing 12 for attachment to a suitable supporting structure. Housing 12 also includes closely fitted slots 20 and 22 for insertion of first pre-filter 21 and second pre-filter 23. In a like manner, post-filter 27 fits in slot 26 and high voltage filter 25, with handle 25*a* is fitted through opening 24. Each of these filters, 21, 23, 25 and 27, is located so as to be easily removed for cleaning or replacement. FIG. 2 shows an enclosed automotive installation of the preferred embodiment 10 but, in another instance, the unit may be located overhead or under a seat as an open, unducted installation. A cut-away view of vehicle 30, having passenger compartment 31, shows rear shelf 32 behind seats 35. Housing 12 is mounted underneath shelf 32 so that the filters, which cannot be seen in this view, can be serviced from the inside of trunk 36. Inlet vent 33 and outlet vent 34 are connected to inlet duct 18 and outlet duct 19 respectively so as to circulate passenger compartment air through housing 12.

Figure 3:
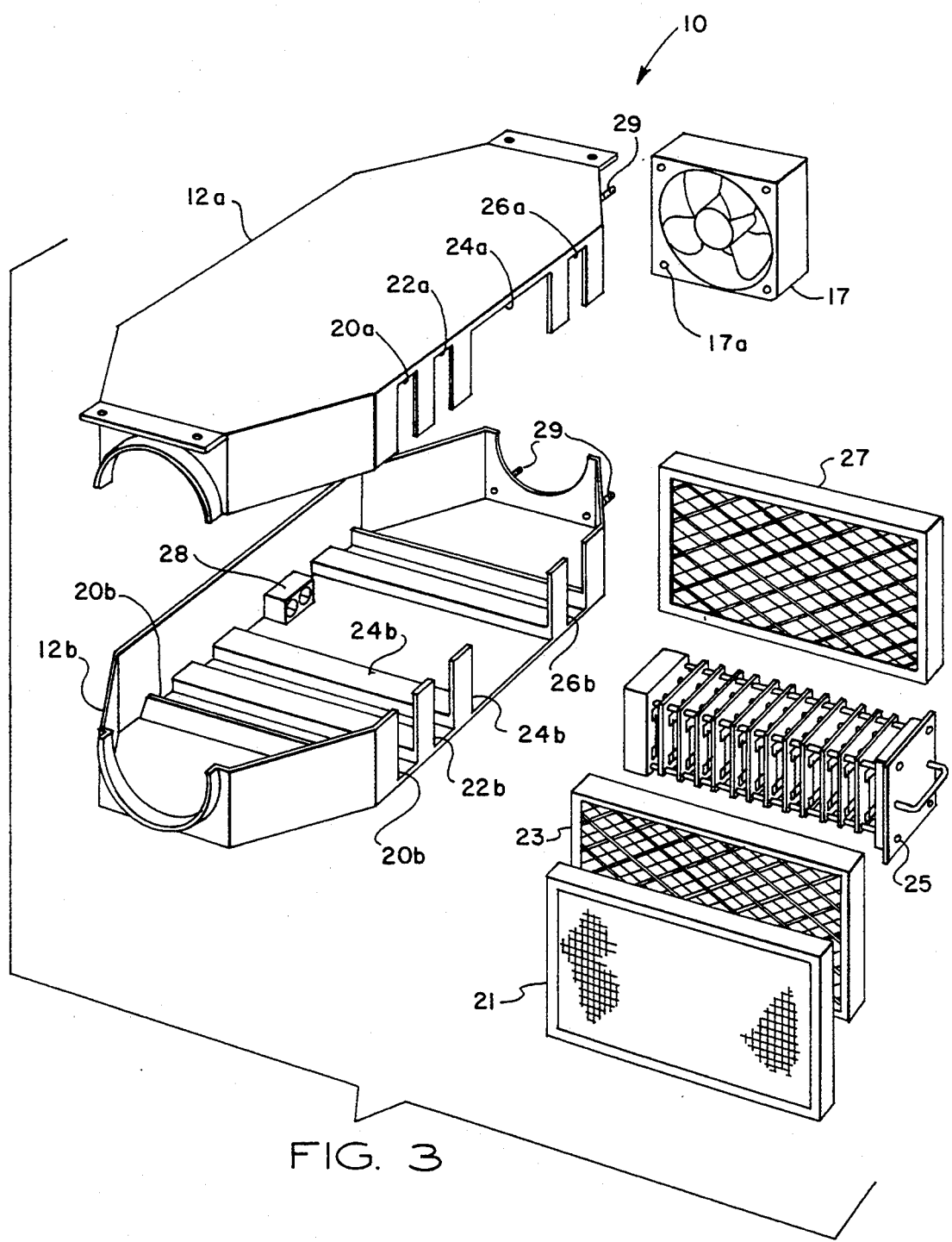
FIG. 3 shows a disassembled view of the components of the filter unit of FIG. 1.

In FIG. 3, the internal arrangement of preferred embodiment 10 is shown in greater detail. Fan 17 is assembled to housing 12 with studs 29 fitting through mounting holes 17*a*. Housing 12 has upper half-section 12*a* and lower half-section 12*b*, separated so that it can be seen that the respective slots 20(*a&b*), 22(*a&b*), 24(*a&b*) and 26(*a&b*), extend across the width of housing 12. The extended width of slots 20, 22, 24 and 26 serves to blank off the non-working edge portions, and direct the air flow smoothly through the main working portions, of filters 21, 23, 25 and 27. Also, the filters are both guided into position and fully supported during operation by the extended width of slots 20, 22, 24 and 26. Guidance is particularly desirable in the case of high voltage filter 25, to insure proper engagement of power connection 28.

Pre-filter 21 is a woven or foam filter of conventional design which serves to collect the larger particulate and thereby, to extend the cleaning intervals of high voltage filter 25. Second pre-filter 23 provides for air purifying agents such as that sold under the trademark HOPCA-LITE, which acts as a catalyst for removal of carbon monoxide and other gases but can break down mechanically to produce a very fine dust. HOPCALITE, is a commercial product of Callery Chemical Co., Pittsburgh, Pa. The use of such material in a pre-filter allows downstream collection of any such dust by high voltage filter 25. Post-filter 27 is used for treating odors, which can pass through filter 25, with an agent such as activated charcoal. The placement is advantageous for this sort of material because particulate loading is eliminated and latent dust is not a problem.

The configuration of high voltage filter 25 is shown in detail in FIGS. 4, 4(a) and 5. Shown here are fourteen negatively charged, conductive plates 40, in a uniformly spaced and mutually parallel array alternating with thirteen positively charged conductive plates 42. Negatively charged plates 40 are structurally located by four tie rods 50, which pass through symmetrically located holes 51 near each corner of plates 40 and through spacers 52 therebetween. Tie rods 53 pass through holes 54 located in positively charged plates 42 in a similar manner and also through spacers 55, of the same length as spacers 52. Tie rods 53 and spacers 55 are aligned to pass through clearance holes 56 in negatively charged plates 40 so as to maintain air space for electrical isolation of positively and negatively charged parts. It may be noted at this point, that the width of positively charged plates 42 is somewhat less than that of negatively charged plates 40 and that this excess width is the part of high voltage filter 25 which fits within extended slot 24(a&b) in operation. Two similar arms 44 extend outwardly from the body of positively charged plate 42 and ionizing wire 46 is stretched across and welded in place at the end of arms 44. In assembly, ionizing wire 46 lies in, or parallel and adjacent to, the plane of the widthwise edges of negatively charged plates 40. Thus supported, ionizing wire 46 is restrained from vibration and movement relative to adjacent parts. Tie rods 50 and 53 are threaded and nutted at the ends to allow tensioning for structural rigidity on assembly. Positively charged tie rods 53 are relatively short and terminate inside of end boxes 41 and 48 where bushings 58 provide insulation from negatively charged parts. End boxes are filled with an insulating potting material 58 for electrical insulation, sealing and shock protection. Negatively charged tie rods 50 are threaded into end box 41 and extend through cover plate 45 at the opposite end where nuts 49 complete the assembly.

Structural rigidity and precise positioning of oppositely charged parts permits operation of high voltage filter 25 at levels higher than 5,000 VDC, which permits greater efficiency than can normally be realized in vehicular filter applications.

Receptacle 62, which engages power connection 28, (Ref. FIG. 3) is located on the unseen back side of end box 41. The high voltage generator 60 is preferably a solid state device and, inasmuch as the power output is actually very low, the heat dissipation rate is also low, and it may be located inside end box 41. Although high voltage generator 60 need not be part of filter 25, making it so allows the power connection 28 to be a simple low voltage link. Potting of solid state circuitry is a practice well known in the electronic arts, and the low heat dissipation rate of high voltage generator 60 allows the process to be used for its protection.

Figure 6:
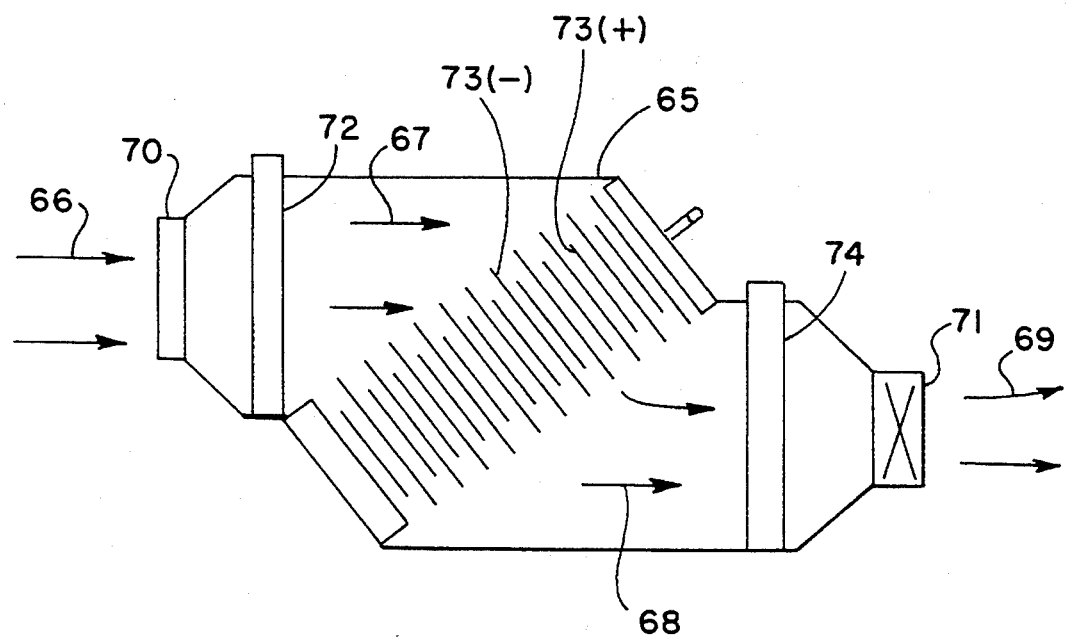
FIG. 6 a schematic arrangement of components in an alternate embodiment of the invention.

FIG. 6 illustrates another efficiency enhancement applicable to the present invention. Here, air movement through filter housing 65 is shown by arrow 66, at inlet 70; arrow 67, downstream from pre-filter 72; arrow 68, entering post-filter 74; and 69, exiting fan 71. Electrically charged plates 73(+) and 73(−) are placed at an angle relative to the direction of entering air flow indicated by arrow 67. Thus, air is deflected to flow between plates 73(+) and 73(−) and the inertia of airborne particulate urges it into contact. Although quietness of operation and collection efficiency are promoted by low air flow rates, so that true turbulence is not evident, angling of plates 73(+) and 73(−) introduces a degree of directional disorder that also promotes particulate contact and collection.

Figure 7:
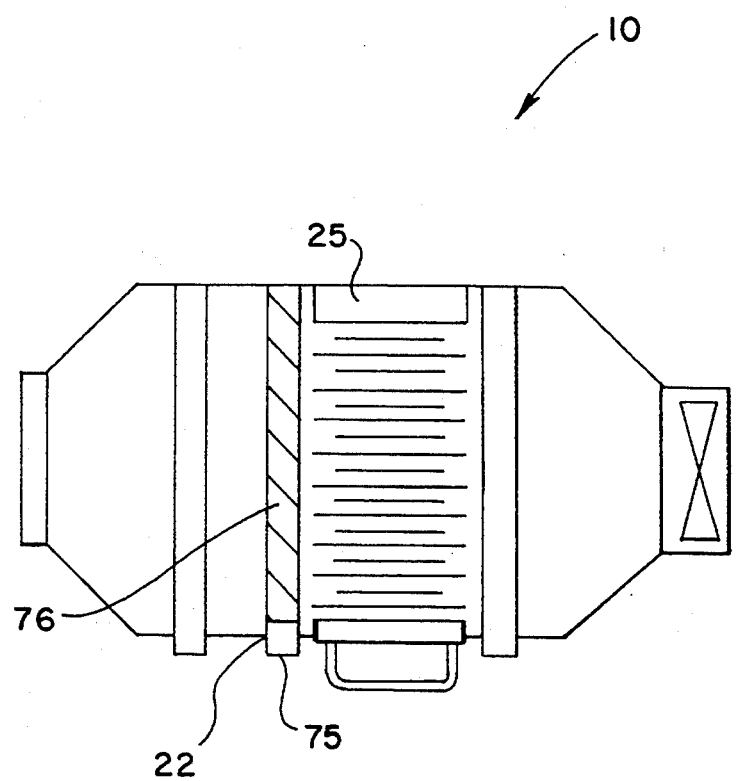
FIG. 7 shows a schematic of alternate components in the preferred embodiment of the invention.

FIG. 7 illustrates how the result obtained in filter 65 of FIG. 6 is realized in the preferred embodiment 10. Second pre-filter slot 22 is fitted with deflector 75 having a plurality of angled vanes 76 which direct air flow to contact the plates of high voltage filter 25 at an angle.

It is to be understood that the present invention is not limited to the disclosed embodiments and may be expressed by rearrangement or modification or substitution of parts within the same spirit.

I claim:

1. A compact electrostatic air filtering apparatus for mobile applications for receiving air to be filtered from a passenger compartment of a vehicle and for recirculating filtered air back to said passenger compartment, said air filtering apparatus comprising:

a housing having an air inlet duct and an air discharge duct and a substantially transverse slot extending within said housing across an airflow path within said housing between said air inlet duct and said air discharge duct; and a high voltage electrostatic filter unit with means for positioning in said slot, said filter unit comprising:

opposed, spaced-apart support members;

a set of plural first conductive plates disposed between said support members and spaced apart from each other in substantially parallel relationship;

a set of plural first spaced apart tie rods extending between said support members and through respective openings in each of said first conductive plates, and plural spacers sleeved on said first tie rods and extending between adjacent ones of said first conductive plates for holding said first conductive plates in substantially evenly spaced and parallel relationship;

a set of plural second conductive plates disposed between said support members, respective ones of said second conductive plates being disposed between respective ones of adjacent first conductive plates and in substantially evenly spaced and parallel relationship to said first conductive plates, respectively;

a set of plural second tie rods extending between said support members and through clearance openings in said first conductive plates and in supporting relationship to said second conductive plates, respectively, and spacers sleeved on said second tie rods, respectively, and between adjacent ones of said second conductive plates for holding said second conductive plates in substantially evenly spaced and parallel relationship to each other and to said first conductive plates;

each of said plates of one of said sets of plates having spaced apart support arm means extending from one side thereof and supporting an ionizing wire between said support arms and at an air inlet end of a flow path defined by said plates for air to be filtered as it flows through said filter unit;

insulator means engaged with one of said sets of tie rods in supporting relationship thereto and disposed on said support members, respectively, for electrically isolating said one set of tie rods from said support members;

said tie rods having opposed ends, respectively, operably engaged with said support members, respectively, and forming sole support means for said sets of conductive plates between said support members; and means for adjusting the tension in said tie rods to provide a substantially rigid electrostatic filter unit which may be slidably inserted in and removed from said housing for cleaning said plates to remove accumulated particulates therefrom, respectively.

2. The filter apparatus set forth in claim 1 wherein: each of said tie rods is threaded on at least one end and is provided with cooperating nut means for adjusting the tension in said tie rod between said support members.

3. The filter apparatus set forth in claim 1 wherein: said support members comprise, respectively, substantially rectangular box enclosures and one of said support members includes means engageable with an electrical power connector member disposed in said housing and at one end of said slot for engagement with said support member to form an electrical connection between said filter unit and a source of electric power.

4. The filter apparatus set forth in claim 3 wherein: the support member opposite the support member which is engageable with said connector includes a substantially planar cover plate for closing one end of said slot in said housing when said filter unit is disposed therein.

5. The filter apparatus set forth in claim 4 including: a handle connected to said cover plate for sliding said filter unit into and out of said housing.

6. The filter apparatus set forth in claim 1 wherein: said ionizing wires are disposed on said second conductive plates; and said first conductive plates and said support members are negatively charged and said second conductive plates and said ionizing wires are positively charged by said source of electric power.

7. A compact electrostatic air filtering apparatus for mobile applications for receiving air to be filtered from a passenger compartment of a vehicle and for recirculating filtered air back to said passenger compartment, said air filtering apparatus comprising:

a housing having an air inlet duct and an air discharge duct and a substantially transverse slot extending within said housing across an airflow path within said housing between said air inlet duct and said air discharge duct; and a high voltage electrostatic filter unit with means for positioning in said slot, said filter unit comprising:

opposed, spaced-apart support members, each of said support members comprising a substantially rectangular box enclosure, said support members being disposed substantially parallel to each other and spaced apart to delimit an air flow path therebetween when said filter unit is disposed in said slot;

a set of plural first conductive plates disposed between said support members and spaced apart from each other in substantially parallel relationship;

a set of plural first spaced apart tie rods extending between said support members and through respective openings in each of said first conductive plates, and means on said first tie rods extending between adjacent ones of said first conductive plates for holding said first conductive plates in substantially evenly spaced and parallel relationship to each other and to said support members;

a set of plural second conductive plates disposed between said support members, respective ones of said second conductive plates being disposed between respective ones of adjacent first conductive plates and in substantially evenly spaced and parallel relationship to said first conductive plates, respectively;

a set of plural second tie rods extending between said support members and through clearance openings in said first conductive plates and in supporting relationship to said second conductive plates, respectively, and means on said second tie rods between adjacent ones of said second conductive plates for holding said second conductive plates in substantially evenly spaced and parallel relationship to each other and to said first conductive plates;

each second conductive plate having spaced apart support arm means extending from one side thereof and supporting an ionizing wire between said support arms and at an air inlet end of said flow path;

insulator means engaged with said second tie rods in supporting relationship thereto and disposed on said support members, respectively, for electrically isolating said second tie rods from said support members;

said tie rods having opposed ends, respectively, operably engaged with said support members, respectively, and forming sole support means for said sets of conductive plates between said support members;

one of said support members includes means engageable with an electric power connector member disposed in said housing and at one end of said slot for engagement with said one support member to form an electrical connection between said filter unit and a source of electric power; and the support member opposite the support member which is engageable with said connector includes a substantially planar cover plate for closing one end of said slot in said housing when said filter unit is disposed therein.

8. The filter apparatus set forth in claim 7 including: a handle connected to said cover plate for sliding said filter unit into and out of said housing.

9. The filter apparatus set forth in claim 7 wherein:

said ionizing wires are disposed on said second conductive plates; and said first conductive plates and said support members are negatively charged and said second conductive plates and said ionizing wires are positively charged by said source of electric power.

10. The filter apparatus set forth in claim 7 wherein:
said one support member includes a high voltage generator disposed therein and operable to charge said conductive plates with a high voltage DC charge when said one support member is connected to said connector.

* * * * *